United States Patent [19]

Furuse

[11] Patent Number: 4,686,638

[45] Date of Patent: Aug. 11, 1987

[54] LEAKAGE INSPECTION METHOD WITH OBJECT TYPE COMPENSATION

[75] Inventor: Akio Furuse, Hachioji, Japan

[73] Assignee: Kabushiki Kaisha Kosumo Keiki, Tokyo, Japan

[21] Appl. No.: 666,082

[22] Filed: Oct. 29, 1984

[30] Foreign Application Priority Data

Nov. 4, 1983 [JP] Japan .......................... 58-171441[U]
Nov. 21, 1983 [JP] Japan .......................... 58-180680[U]
Jan. 6, 1984 [JP] Japan .................................. 59-669[U]

[51] Int. Cl.$^4$ ........................ G01M 3/32; G06F 15/46
[52] U.S. Cl. .................................... 364/558; 73/49.2; 364/479; 364/507; 364/571
[58] Field of Search ...................... 73/49.2, 49.3, 52; 364/479, 558, 580, 507, 150, 151, 176, 571

[56] References Cited

U.S. PATENT DOCUMENTS

| | | | |
|---|---|---|---|
| 3,504,528 | 4/1970 | Weinberg et al. | 73/49.3 |
| 3,839,900 | 10/1974 | Fukuda | 73/49.3 |
| 4,205,551 | 6/1980 | Clifford et al. | 73/52 |
| 4,226,125 | 10/1980 | Waush | 73/708 |
| 4,272,985 | 6/1981 | Rapson, Jr. et al. | 73/49.2 |
| 4,303,984 | 12/1981 | Hourig | 364/571 |
| 4,426,876 | 1/1984 | Kakumoto | 73/49.3 |
| 4,462,082 | 7/1984 | Thiele et al. | 364/507 |
| 4,490,800 | 12/1984 | Powers | 364/558 |
| 4,571,986 | 2/1986 | Fujii et al. | 73/49.1 |

Primary Examiner—Errol A. Krass
Assistant Examiner—Daniel W. Juffernbruch
Attorney, Agent, or Firm—Pollock, Vande Sande and Priddy

[57] ABSTRACT

A predetermined number of preceding data items, which are obtained through measurement of change in pressure or pressure difference with respect to respective objects inspected and decided to be acceptable, are grouped according to types of the objects and stored in different storage regions. Each time new data is stored, the oldest data in the corresponding storage region is erased. An average of data stored in a designated storage region is computed and each object is decided if it is acceptable or not on the basis of the difference between the newly measured data of the object and the computed average of the data in the designated storage region corresponding to the object.

3 Claims, 19 Drawing Figures

LEAKAGE INSPECTION METHOD WITH OBJECT TYPE COMPENSATION

CROSS REFERENCE TO RELATED APPLICATION

The invention of the present application is an improvement on the subject matter described in applicant's allowed copending applications Ser. No. 674,908 filed Nov. 9, 1984, for "Pressure Variation Detecting Type Leakage Inspection Equipment and Ser. No. 694,448 filed Dec. 21, 1984 for "Pressure Variation Type Leakage Inspection System with Temperature Compensation"

BACKGROUND OF THE INVENTION

The present invention relates to a leakage inspection method for successively inspecting various products under production process, which are required to allow no fluid leakage in use or to keep any fluid leakage within a certain range, to determine the acceptability of the inspected products.

There are various products which are required to be airtight, examples being containers for containing liquids, parts in hydraulic circuits such as automotive brakes, radiators, engine cylinders, products for use with a gas, and wristwatches. Therefore, it has been required in the art to confirm the desired airtightness of the products.

Different methods are known which test whether an object is airtight. One method includes the steps of sealing air in the object, immersing the object in water, and visually checking whether air bubbles are produced from the object. Another method uses a water-column manometer. These known methods have a low detecting sensitivity and difficulty in detecting a slight leakage. Since the object has to be immersed in water or water is poured into the object, the object must be dried at a later time. Another disadvantage is that it is difficult to fully automatize these inspection methods.

There has been proposed a leakage inspection apparatus in which a positive or negative air pressure is introduced into an object to be tested, any variation in the air pressure is detected as an electric signal, and a change in the electric signal is compared with a preset level for determining whether there is a leakage or not and the extent of a leakage, if any. The proposed leakage inspection apparatus imposes no adverse effect on the object as the object is not immersed in water for inspection and hence is not caused to be wet. Since the acceptability of the object tested is determined by comparing electric signals, the apparatus can be fully automatized.

The leakage inspection apparatus of the type described is generally composed of a pnuematic circuit and an electric circuit. The pneumatic circuit includes an air pressure source for generating a certain positive or negative air pressure, a solenoid-operated valve for applying the air pressure from the air pressure source to the object and shutting off the air pressure, and a pressure sensor for detecting a change in the air pressure supplied to the object. The electric circuit comprises an amplifier for amplifying an electric signal issued from the pressure sensor, a discriminator means for comparing a change in the amplified electric signal from the amplifier with a preset level to determine the acceptability of the object, and a controller for sequentially controlling the various parts to repeat a test cycle composed of a pressurizing period in which the solenoid-operated valve is controlled to introduce the air pressure into the object, a balancing period in which the air pressure introduced in the object is stabilized, an inspecting period in which the air pressure in the object is checked for any variation after the time when the balancing period is over, an exhausting period in which air is exhausted from the object upon completion of the inspection, and a rest period in which the inspected object is replaced with another object after air has been exhausted.

The inspection process for applying an air pressure to the object and picking up a change in the air pressure as an electric signal is advantageous in that no water is brought into contact with the object, but has the following disadvantage:

Since air is a gas, it expands and contracts dependent on the temperature of the object, thus changing the air pressure. Therefore, even when there is no leakage under a constant air pressure introduced in the object, the air pressure tends to vary due to thermal expansion or contraction of air, and such a pressure change is responsible for a false determination that there is a leakage.

For example, when an ambient temperature rises gradually, the temperature of air in the object and the temperature of the object itself vary as the ambient temperature changes, with the result that the air pressure in the object will vary due to the variation of the ambient temperature, thereby changing a zero point. A conventional solution to this problem has been to change a preset reference level for determining the presence of a leakage through human intervention as the ambient temperature changes.

However, manually changing the preset reference level requires an operator to attend the inspection apparatus, resulting in an obstacle to automatization.

To cope with the prior problem, the applicant proposed a leakage inspection apparatus as disclosed in Japanese Patent Laid-Open Publication No. 58-50445. The disclosed leakage inspection apparatus has a data storage means which stores data items on a plurality of pressure measurements. When one of such data items is stored, the oldest pressure measurement data item is erased, so that a certain number of latest data items are always stored in the storage means. The latest data items are read out, and an average of such data items is computed. By repeating such a process, a moving average can be obtained which follows a variation in the pressure measurement data items, and is used as a corrective value. A variation of the zero point due to a change in the ambient temperature can therefore be removed by subtracting the moving average or corrective value from a pressure value as currently measured. A similar arrangement is also disclosed in applicant's U.S. application Ser. No. 674, 908 filed Nov. 9, 1984.

With the above inspection apparatus, where the ambient temperature changes, a corresponding change in the air pressure in the object is stored as a data item, an average of changes of air pressures in a plurality of objects inspected is determined, and such an average is employed as a corrective value. In the event of a gradual change in the ambient temperature, the average of the pressure data items is also varied, with the result that the zero point can be corrected properly at all times to remove undesired influences due to the change of the ambient temperature. The above function is referred to by the applicant as an automatic zero-point correcting function.

With this automatic zero-point correcting function, the zero point can automatically be corrected properly without human intervention for leakage inspection of high accuracy.

There are certain occasions in which objects of different shapes should be inspected for leakage. Where objects are of different shapes, deformations caused by applying an air pressure to the objects vary from object shape to object shape, and pressure variations generally differ from object type to object type. Therefore, when an object of different shape is to be inspected, pressure data items stored in the storage means should all be rewritten and a new moving average should be determined.

The storage means normally stores 5 to 10 measured pressure values, and sometimes stores about 100 measured pressure values. Accordingly, it is impossible for one inspection apparatus to inspect a variety of objects in a production line along which various differently shaped objects flow successively.

Where an object is found to allow a large leakage by the leakage inspection apparatus, the air pressure is greatly changed immediately after the air pressure is applied to the object. When this happens, the pressure change already exceeds the preset level for the balancing period in the sequence of the pressurizing period, the balancing period, the inspecting period, the exhausting period, and the rest period. If the pressure change exceeds the preset level in the balancing period, then the conventional apparatus determines that the object suffers from a large leakage. Such determination is performed before the foregoing corrective action is effected.

In determining whether there is such a large leakage, if the pressure sensor and the amplifier for amplifying an output of the pressure sensor electrically undergo a zero point change in excess of the preset level, then the apparatus will determine that there is a large leakage when in fact there is no such a large leakage allowed by the object.

SUMMARY OF THE INVENTION

It is an object of the present invention to provide a leakage inspection method in which moving averages of pressure data items measured for different types of objects can be obtained at all times without rewriting the measured pressure data items, and therefore proper zero point correction can be performed at all times for leakage inspection in case objects of different types are successively supplied for leakage test.

Another object of the present invention is to provide a leakage inspection method in which, when a pressure sensor and an amplifier for amplifying an output from the pressure sensor suffer from a zero point change in excess of a preset level, such a zero point change is detected to display an inspection failure.

According to the present invention, a storage means for storing measured values of an air pressure applied to an object being inspected has a plurality of storage regions for storing measured pressure data items as grouped according to the types of objects, so that averages of measured pressure values for the different types of objects can be retrieved at all times.

Therefore, objects of differing types can successively be inspected for leakage by a single leakage inspection apparatus.

Further according to the present invention, there is a means for determining whether a zero point drift exceeds a preset value within a rest period to ascertain if a zero point drift of a pressure sensor and an amplifier falls within a prescribed range. When the zero point drift of the pressure sensor and the amplifier is in excess of the prescribed range, an inspection failure is indicated.

With this arrangement, the leakage inspection apparatus will not produce a false determination that there is a large leakage with an object due to a zero point drift of the pressure sensor and the amplifier.

In addition, there is provided an interface means for receiving control signals from an external source. When such control signals are fed to the interface means, a control unit effects sequential control through a cycle of a pressurizing period, a balancing period, an inspecting period, an exhausting period, and a rest period.

The provision of the interface means for receiving external control signals allows a plurality of leakage inspection apparatuses to be operated synchronously in parallel to each other. The parallel operation can simultaneously inspect a plurality of objects or a plurality of areas on a single object.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

There are known methods of inspecting an object for airtightness by applying an air pressure to the object. According to one such method, a certain air pressure or vacuum is applied to an object such as a product, and a variation in the air pressure or vacuum is detected by a pressure gauge for detecting any leakage of the object. According to another known method, a comparative tank with no leakage is provided, and a pressure difference between the comparative tank and an object is detected for detecting any leakage of the object.

The former method is disadvantageous in that a small variation in a pressure kept applied to the object is difficult to detect, and hence a small leakage cannot easily be detected.

The latter method is capable of detecting a small leakage by amplifying an electric output from a differential pressure detector which detects a pressure difference between the comparative tank and the object being tested. Therefore, the leakage inspection apparatus with the differential pressure detector has mainly be used in the art. For this reason, a leakage inspection apparatus with a differential pressure detector will be described.

Figure 1:
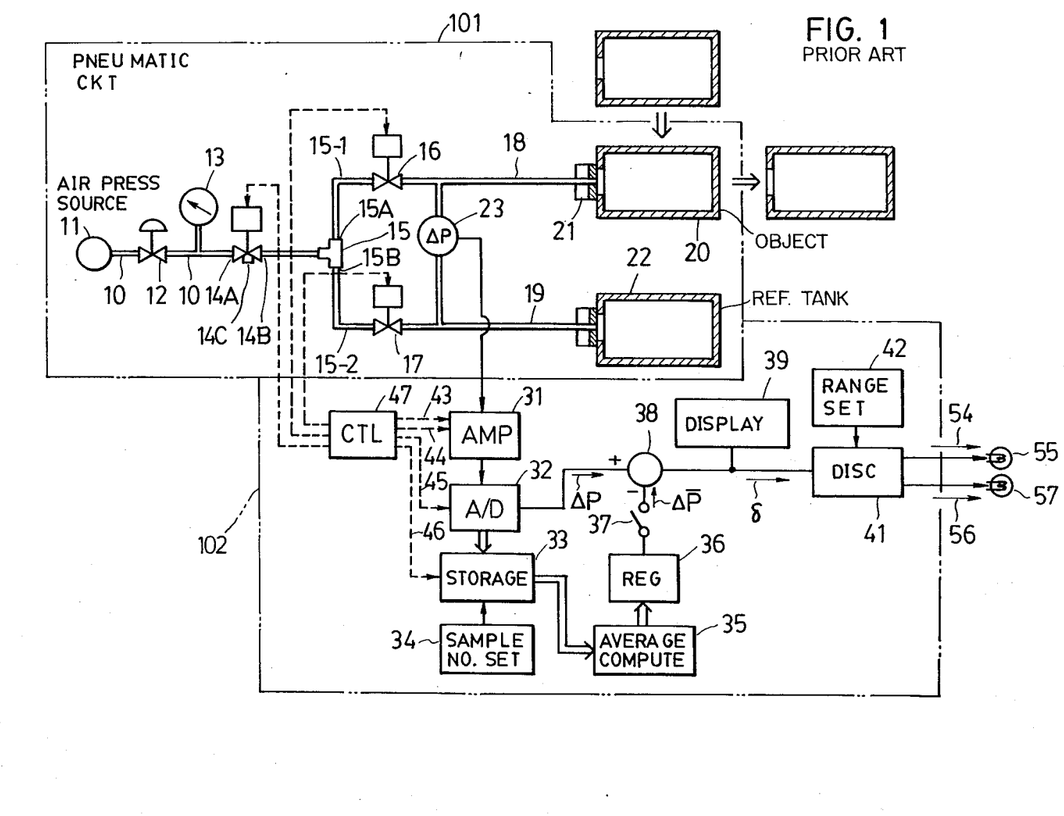
FIG. 1 is a block diagram of a conventional leakage inspection apparatus.

FIG. 1 is a block diagram of a conventional leakage inspection apparatus with a differential pressure detector. The leakage inspection apparatus generally comprises a pneumatic circuit 101 and an electric circuit 102. The pneumatic circuit 101 includes an air pressure source 11, a pipe 10 connected to an outlet of the air pressure source 11, a pressure control valve 12 for presetting an air pressure for leakage inspection, a pressure indicator 13 for indicating the present air pressure, a three-port solenoid-operated valve 14 disposed in the pipe 10 for selecting a mode in which an inlet port 14A and an outlet port 14B are connected, and a mode in which the inlet port 14A is shut off and the outlet port 14B is connected to an air vent port 14C, a T-joint 15 connected to the outlet port 14B of the three-port solenoid-operated valve 14, a branch pipe 15-1 connected to one port 15A of the T-joint 15, and another branch pipe 15-2 connected to the other port 15B of the T-joint 15. The pneumatic circuit 101 also includes shut-off valves 16, 17 connected respectively to the other ends of the branch pipes 15-1, 15-2, pipes 18, 19 connected respectively to outlet ports of the shut-off valves 16, 17, a mechanism 21 mounted on the end of the pipe 18 for connecting to an object 20 to be inspected, a leakage-free reference tank 22 mounted on the end of the pipe 19, and a differential pressure detector 23 interconnected between the pipes 18, 19 for measuring a pressure difference between the pipes 18, 19.

The electric circuit 102 includes an amplifier means 31 for amplifying an electric signal produced by the differential pressure detector 23, an A/D converter 32 for converting an amplified output signal from the amplifier means 31 into a digital signal, a storage means 33 for successively storing measured digital pressure data items which have been converted by the A/D converter 32, a sample number setting unit 34 for setting the number of data items which are to be stored in the storage means 33, an average computing means 35 for reading the pressure data items out of the storage means 33 and computing the average of the pressure data items, a register 36 for holding the computed average, a zero point correcting means 38 for correcting a zero point by subtracting the average held by the register 36 from a digital pressure data item being measured which is converted by the A/D converter 32, and a switch 37 connected between the zero point correcting means 38 and the register 36 for selectively determining whether the zero point should be corrected or not. The electric circuit 102 also comprises a display unit 39 for displaying a corrected data item issued from the zero point correcting means 38, a discriminator means 41 for determining whether the corrected data falls within an allowable range, a range setting unit 42 for giving the allowable range to the discriminator means 41, and a control unit 47 for effecting a control mode in which a zero resetting signal 43 and a gain switching signal 44 are applied to the amplifier means 31 to reset the amplifier means 31 so that its output signal will be zero and to change the gain of the amplifier 31 to a high gain at the time a balancing period is over, for issuing an A/D conversion timing signal 45 to the A/D converter 32, for issuing a read/write command signal 46 to the storage means 33, and for generating signals to control the three-port solenoid-operated valve 14 and the shut-off valves 16, 17 in the pneumatic circuit 101.

Figures 2A, 2B:
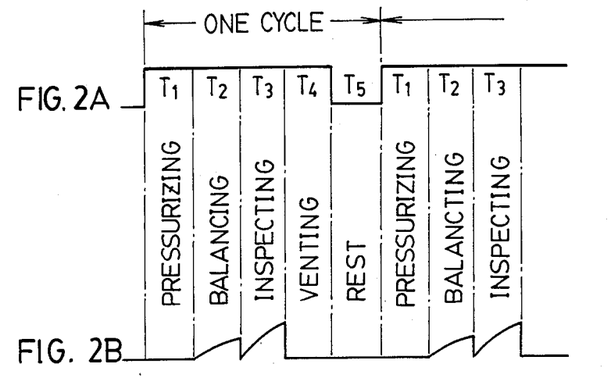
FIGS. 2A and 2B are diagrams of waveforms explanatory of operation of the apparatus shown in FIG. 1.

The air pressure source 11 may be of a construction as disclosed in U.S. Pat. No. 4,241,750, for example. The air pressure source 11 generates a certain positive or negative air pressure, which is controlled by the pressure control valve 12 to be a pressure suitable for leakage inspection. The controlled air pressure is indicated by the pressure indicator 13 and supplied to the three-port solenoid-operated valve 14. As illustrated in FIG. 2A, the leakage inspection apparatus has one inspection cycle of operation which is composed of a pressurizing period $T_1$, a balancing period $T_2$, an inspecting period $T_3$, a pressure releasing period $T_4$, and a rest period $T_5$ for inspecting one object. The time required for completing one inspection cycle ranges from about 10 to 30 seconds dependent on the interior volume of the object 20. Timer switches for determining the times of the periods $T_1$, $T_2$, $T_3$, $T_4$, $T_5$ are arranged to set desired times in the range of from 1 to 30 seconds.

In the pressurizing period $T_1$, the three-port solenoid-operated valve 14 connects the inlet port 14A and the outlet port 14B for supplying the air pressure as controlled by the pressure control valve 12 to the object 20 and the reference tank 22 through the shut-off valves 16, 17, respectively.

Figure 3:
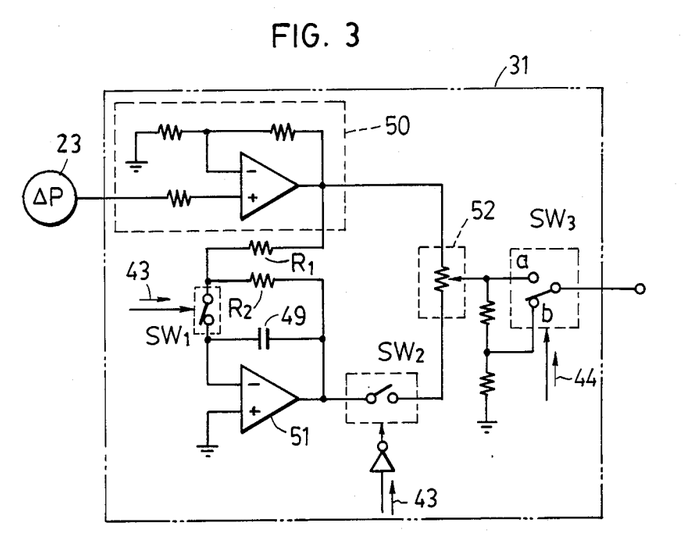
FIG. 3 is a circuit diagram, partly in block form, of an amplifier capable of zero resetting and gain switching in a leakage inspection apparatus.

When the pressurizing period $T_1$ is over, the shut-off valves 16, 17 are closed and the operation enters the balancing period $T_2$. The balancing period $T_2$ waits for the air supplied to the object 20 and the reference tank 22 to come to rest, the balancing period $T_2$ being generally 2 seconds. Upon completion of the balancing period $T_2$, the amplifier means 31 is reset so that its output will be zero. The amplifier means 31 is constructed as will be explained with respect to FIG. 3. As depicted in FIG. 3, the output of the differential pressure detector 23 is connected to the input of an amplifier 50, the output of which is connected through a resistor $R_1$ and a switch $SW_1$ to an inverting input terminal of an operational amplifier 51, whose non-inverting input terminal is grounded. A capacitor 49 is connected between the inverting input and output of the amplifier 51. A feedback resistor $R_2$ is connected between the output of the amplifier 51 and the junction between the resistor $R_1$ and the switch $SW_1$, thereby constituting an inverting amplifier having a gain $-R_2/R_1$ when the switch $SW_1$ is in an ON-state. For example, the gain $-R_2/R_1$ may be minus one. The output of the amplifier 51 is connected via a switch $SW_2$ to one of fixed terminals of a potentiometer 52, the other fixed terminal thereof being connected to the output of the amplifier 50. A full voltage and a divided voltage of the output from a movable terminal of the potentiometer 52 are selectively obtained via a switch $SW_3$ as an output of the amplifier means 31. The movable terminal of the potentiometer 52 has been adjusted, beforehand, to be at a neutral position.

During periods other than the inspecting period $T_3$, the switches $SW_1$ and $SW_2$ are kept ON and OFF, respectively, and the switch $SW_3$ is connected to the side "b". In this state, the capacitor 49 always stores the output voltage of the amplifier 51, which is equal in magnitude to the output voltage of the amplifier 50 but opposite in polarity therefrom. Upon the end of the balancing period $T_2$, the switches $SW_1$ and $SW_2$ are simultaneously turned OFF and ON, respectively, thus instantaneously resetting the output of the potentiometer 52 and, therefore, the output of the amplifier means 31 to zero. At the same time, the switch $SW_3$ is changed over to the side "a" to cause the amplifier means 31 to have a higher gain, thereby entering into the inspecting period $T_3$. In the inspecting period $T_3$, the gain of the amplifier means 31 is switched to a gain which is several times higher than the gain given by selecting the side "b" of the switch $SW_3$, for example, in the balancing period $T_2$, so that a slight change in the output from the differential pressure detector 23 can be amplified and detected. Therefore, a slight leakage in the object 20 can be detected as a change in the differential pressure. FIG. 2B illustrates, by way of example, the waveform of an output voltage from the amplifier means 31. At the time the inspecting period $T_3$ is finished, a measured value $\Delta P_i$ issued from the amplifier means 31 is converted by the A/D converter 32 into a digital value which is applied to the zero point correcting means 38. The measured pressure value $\Delta P_i$ is a pressure drift produced by the pneumatic circuit 101, and gradually varies dependent on the ambient temperature, the temperature of the object 20, and the like. The zero point correcting means 38 is supplied with an average $\overline{\Delta P_i}$ of the preceding k measured pressure values $\Delta P_{i-k-1}$, $\Delta P_{i-1}, \ldots \Delta P_{i-1}$ as computed by the average computing means 35, and computes $\delta_i = \Delta P_i - \overline{\Delta P_i}$ for correcting any zero point change with respect to the pressure value $\Delta P_i$ being measured.

Figure 4:
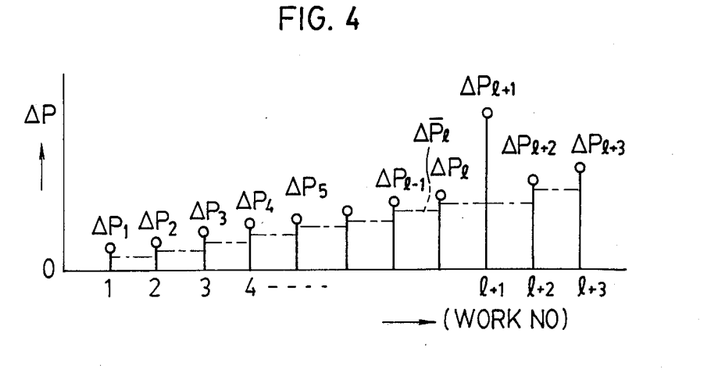
FIG. 4 is a graph showing a pressure value measured by applying an air pressure to an object and picking up a change in the air pressure to detect a leakage.
Figure 5:
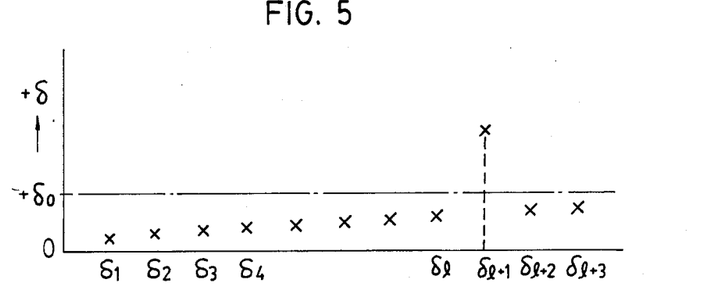
FIG. 5 is a graph showing corrected data in which the measured pressure value shown in FIG. 4 is corrected by an average of past measured pressure values.

FIG. 4 shows one example of zero point correction in which the measured pressure values $\Delta P_i$ vary so that they are progressively increased at about a constant rate. The average $\overline{\Delta P_i}$ of the preceding k pressure values is also progressively increased following the rate of increase of the pressure values $\Delta P_i$. Therefore, corrected data items $\delta_i$ are of substantially constant values $\delta_1, \delta_2, \delta_3, \ldots, \delta_{l+2}, \delta_{l+3}$ from which zero point changes have been removed, as shown in FIG. 5. FIGS. 4 and 5 show that an (l+1)th object is defective.

The corrected data $\delta_i$ issued from the zero point correcting means 38 is displayed on the display unit 39 and applied to the discriminator means 41 which determines whether the object being inspected is acceptable or not. The discriminator means 41 is supplied with an allowable limit value $\delta_0$ from the range setting unit 42 for determining that the object is defective when the corrected data $\delta_i$ exceeds the allowable limit value $\delta_0$, and that the object is acceptable when the corrected data $\delta_i$ is below the allowable limit $\delta_0$. When the object is determined as being acceptable, the discriminator means 41 issues an acceptance signal 54 to energize an acceptance indicator 55 to indicate the acceptability of the object. When the object is determined as being defective, the discriminator means 41 issues a defect signal 56 to cause a defect indicator 57 to indicate that the object is defective.

When the discriminator means 41 determines that the object is acceptable, the control unit 47 receives the acceptance signal 54 to issue a write signal 46 to the storage means 33 to write the digital output signal currently issued from the A/D converter 32 into the storage means 33. The number of data items to be written into the storage means 33 can be established as desired by the sample number setting unit 34. In general, the number of data items to be written into the storage means 33 ranges from 5 to 10, but may sometimes range from 50 to 80 where the rate of change of the measured differential pressure $\Delta P_i$ is quite low. Therefore, the sample number setting unit 34 can set any number ranging from 1 to 99.

When the discriminator means 41 issues the acceptance signal 54, the inspecting period $T_3$ is completed. The control unit 47 gives the storage means 33 a write command signal 46 to write the digital signal from the A/D converter 32 into the storage means 33, opens the shut-off valves 16, 17, and controls the three-port solenoid-operated valve 14 so that the outlet port 14B communicates with the air vent port 14C and the inlet port 14A is closed. As a result, the air pressure in the object 20 and the reference tank 22 is vented to atmosphere, and the ends of the differential pressure detector 23 are under atmospheric pressure, with the result that the pressure difference becomes zero.

Upon completion of the pressure releasing period $T_4$, the object 20 is replaced with a new object during the rest period $T_5$. A given period of time after the rest period $T_5$ has elapsed, a next inspection cycle is started to repeat an inspecting operation similar to the above operation.

The conventional leakage inspection apparatus with the automatic zero point correcting capability or function has had only one storage means 33. Therefore, when the type of the object 20 is changed, no proper zero point correction can be effected unless and until a plurality of measured pressure values $\Delta P$ are obtained from the changed object and stored in the storage means 33.

Figure 6:
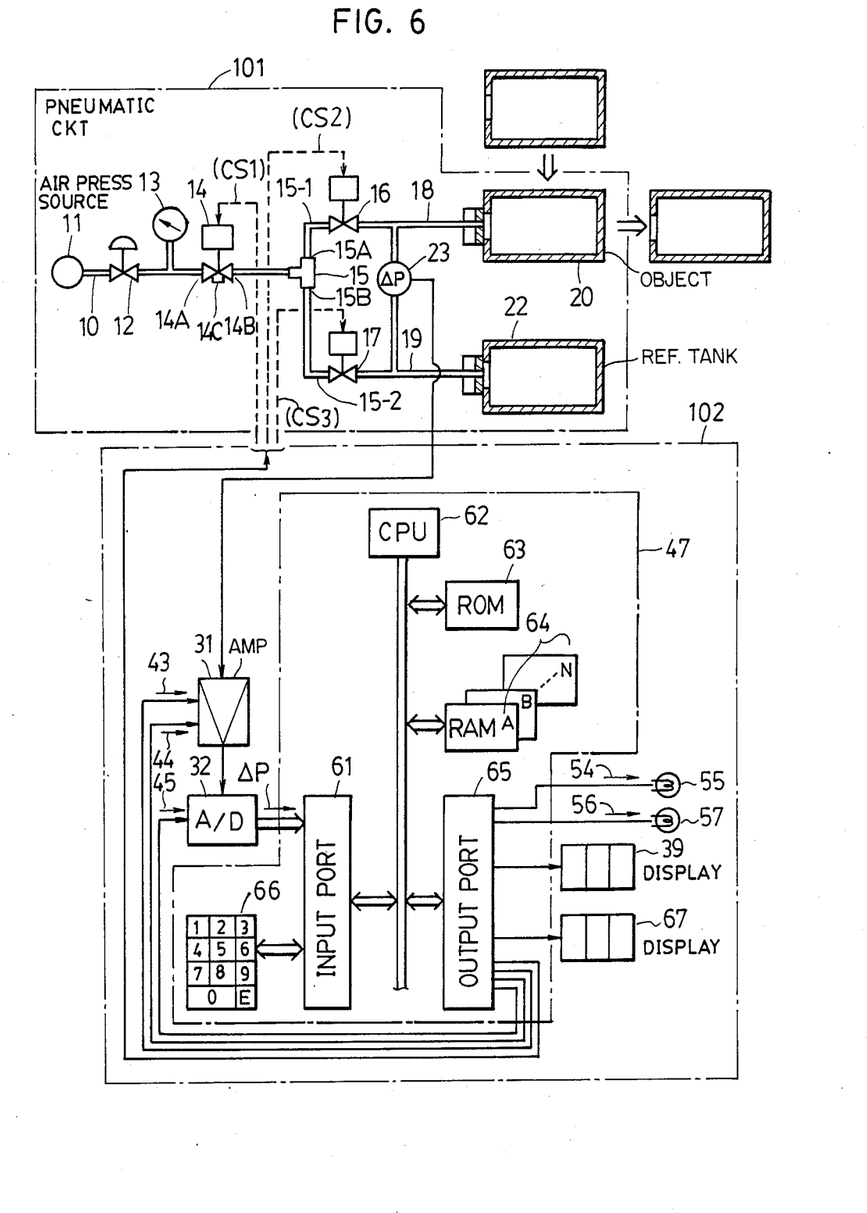
FIG. 6 is a block diagram of a leakage inspection apparatus according to an embodiment of the present invention.

FIG. 6 illustrates a leakage inspection apparatus according to an embodiment of the present invention. In the leakage inspection apparatus of the invention, the arrangements of pneumatic circuit 101, amplifier means 31, and A/D converter 32 are identical to those shown in FIG. 1. Therefore, these components are denoted by the same reference characters, and will not be described in detail. This embodiment of the invention shows an example, wherein a microcomputer is employed as a control unit 47.

The microcomputer comprises an input port 61, a central processing unit (hereinafter referred to as a "CPU") 62, a read-only memory (hereinafter referred to as a "ROM") 63, a random-access memory (hereinafter referred to as a "RAM") 64, an output port 65, and a keyboard 66. The output port 65 issues control signals to the three-port solenoid-operated valve 14 and the shut-off valves 16, 17, a zero reset control signal 43 and a gain switching signal 44 to the amplifier means 31, and an A/D conversion timing signal 45 to the A/D converter 32, for controlling the pneumatic circuit 101, the amplifier means 31, and the A/D converter 32 according to a predetermined control sequence.

The control unit 47 successively reads measured pressure data items $\Delta P_i$ from the A/D converter 32 into the CPU 62 through the input port 61. Where a plurality of past measured pressure data items $\Delta P_i$ are stored in the RAM 64, they are successively read and processed to compute their average $\Delta \overline{P}_i$ by the CPU 62 which operates under a program stored in the ROM 63. The computed average $\Delta \overline{P}_i$ is subtracted from a pressure data item $\Delta P_i$ being measured at the present time to produce a corrected data value $\delta_i$, which will be compared with a preset value $\delta_0$. When the corrected data $\delta_i$ is smaller than the preset value $\delta_0$, then the object is determined as being acceptable, and when the corrected data $\delta_i$ is in excess of the preset value $\delta_0$, then the object is determined as being defective, the acceptability and defectiveness of the object being indicated on an acceptance indicator 55 and a defect indicator 57, respectively. Simultaneously, the corrected data $\delta_i$ is displayed on the numerical display unit 39.

When the object inspected is determined as being acceptable, the inspection data stored in the CPU 62 is transferred to a data storage region in the RAM 64, and the oldest measured pressure data is erased from the region in the RAM 64. Therefore, new pressure data items are successively read to determine a moving average in a certain period. The microcomputer thus implements a computing means for computing a moving average $\Delta \overline{P}_i$ from a plurality of measured pressure data items, a correcting means for correcting a pressure data item being measured with the moving average, and a discriminator means for determining whether an object is acceptable or not by comparing the corrected data from the correcting means with a preset level $\delta_0$.

According to the present invention, measured pressure data items to be stored in the RAM 64 are written and read in groups divided according to inspecting conditions. More specifically, the RAM 64 has a plurality of storage regions A, B, C, . . . , N for successively storing therein measured pressure data items grouped according to different inspecting conditions.

To store the measured pressure data items as grouped according to inspecting conditions, the storage regions A, B, C, . . . , N are selected by the keyboard 66 serving as a setting means. The storage regions A, B, C, . . . , N are manually selected according to the type of the object 20 being inspected, and measured pressure data items are stored in the selected storage region.

The storage regions A through N can be selected as follows: When "01E" is entered manually by the keyboard 66 to specify the storage region A, data items are successively read into the storage region A unless the storage region is changed. When the type of the object is changed after several inspecting cycles, the storage region is also changed by entering a number allotted to a new object type through the keyboard 66. For example, the storage region B can be specified by entering "02E" through the keyboard 66. The storage region is changed only when the type of object to be inspected is changed, so that it is not necessary to effect operation to specify a storage region as long as products of the same time are supplied for leakage inspection. A numeral entered from the keyboard 66 and displayed on a display unit 67 can indicate which storage region is in use at present.

Figure 7:
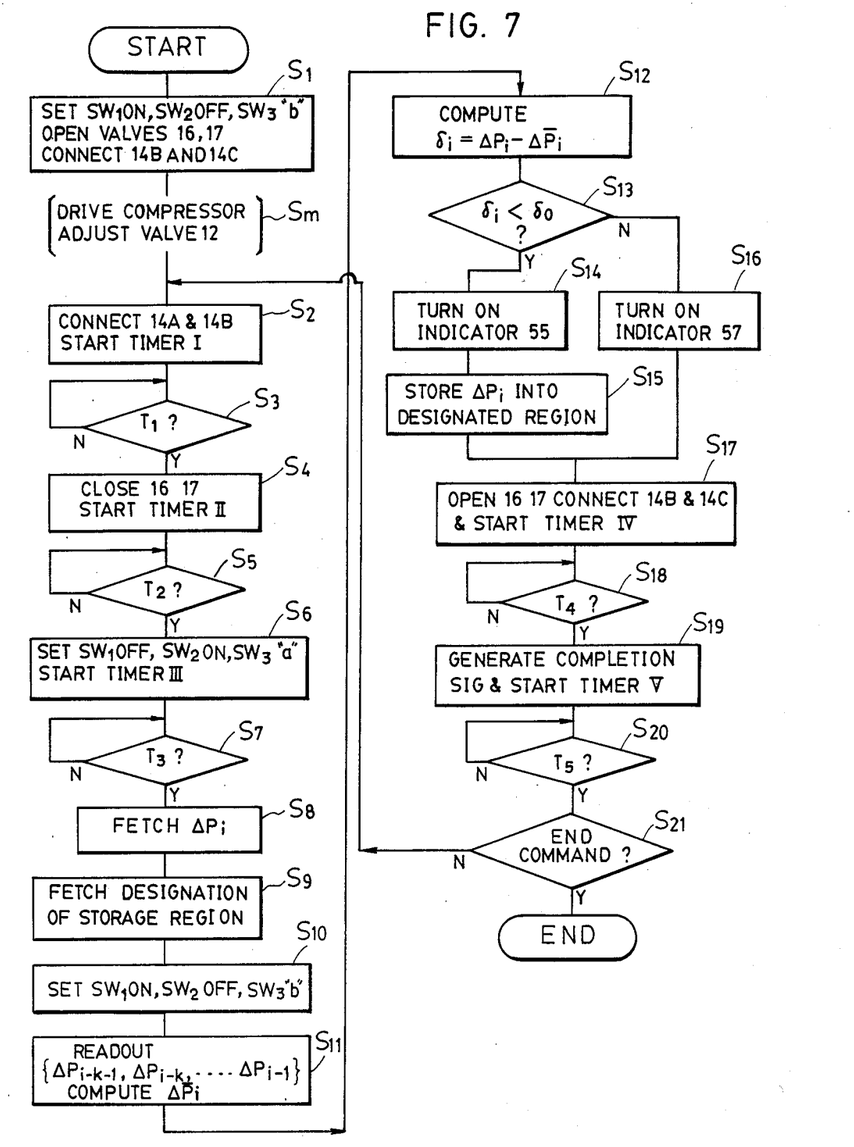
FIG. 7 is a flowchart of progressive steps of operation of the leakage inspection apparatus shown in FIG. 6.

FIG. 7 shows a flowchart of progressive steps of operation of the electric circuit 102 in the leakage inspection apparatus illustrated in FIG. 6.

In step $S_1$, the switches $SW_1$, $SW_2$ and $SW_3$ are set to ON, OFF and the side "b" respectively the valves 16, 17 are opened and the valve 14 is actuated to connect the outlet port 14B and the vent port 14C. In step $S_m$, the operator manually actuates a switch to drive a compressor constituting the air pressure source 11, and then, adjusts the valve 12 to attain a desired pressure. In step $S_2$, the valve 14 is actuated to connect the inlet port 14A and the outlet port 14B, and a timer I is started. In step $S_3$, it is checked if period $T_1$ has elapsed. After the lapse of $T_1$, in step $S_4$, the valves 16, 17 are closed and a timer II is started. In step $S_5$, it is checked if period $T_2$ has elapsed. After the lapse of $T_2$, in step $S_6$, the switches $SW_1$ and $SW_2$ are turned OFF and ON, respectively, and the switch $SW_3$ is connected to the side "a", thereby zero-resetting the amplifier means 31. At the same time, a timer III is started. In step $S_7$, it is checked if time period $T_3$ has elapsed. After the lapse of $T_3$, in step $S_8$, an A-D converted data $\Delta P_i$ is fetched from the A-D converter 32 via the input port 61. In step $S_9$, input data indicating the storage region to be used is fetched from the input port 61. In step $S_{10}$, the switches $SW_1$, $SW_2$ and $SW_3$ are set to ON, OFF and the side "b", respectively. In step $S_{11}$, data $\{\Delta P_{i-k-1}$ to $\Delta P_{i-1}\}$ in the designated region are readout and a moving average $\Delta \overline{P}_i$ is computed. In step $S_{12}$, a corrected value $\delta_i$ is computed. In step $S_{13}$, it is checked if $\delta_i$ is smaller than the present value $\delta_0$. If the corrected value $\delta_i$ is smaller than the preset value $\delta_0$, the process proceeds to step $S_{14}$, in which an acceptance signal 54 is generated to turn ON the indicator 55. Thereafter, in step $S_{15}$, the measured data $\Delta P_i$ is stored into the designated storage region. If the corrected value $\delta_i$ is decided to be equal to or greater than the preset value $\delta_0$ in step $S_{13}$, a not-acceptance signal 56 is generated to turn ON the indicator 57 in step $S_{16}$. After either step $S_{15}$ or $S_{16}$, the valves 16, 17 are opened and the valve 14 is actuated to connect the outlet port 14B and the vent port 14C and then a timer IV is started in step $S_{17}$. In step $S_{18}$, it is checked whether period $T_4$ has elapsed. If so, in step $S_{19}$, a completion signal is generated and a timer V is started. In step $S_{20}$, it is checked if the period $T_5$ has elapsed. If so, it is checked in step $S_{21}$ if an end command has been entered. If so, the measurement process stops; otherwise, it goes to step $S_2$.

It is possible to arrange that the generated completion signal is used to turn ON an indicator (not shown) to inform the operator that the tested object is ready to be replaced by the next object to be tested. Informed by the indicator, the operator may manually replace the objects during the next rest period $T_5$. Also, it is possible to arrange that the generated completion signal is used to actuate a device (not shown) for automatically replacing the objects. In the flowchart of FIG. 7, the timers I to V may be hardware-constructed; however, since the operation "START TIMER" is always followed immediately by a period decision operation ($S_3$, $S_5$, $S_7$, $S_{18}$ or $S_{20}$), each of the timers I to V can be software-materialized by repeatedly executing NOP (no-operation) a predetermined number of times corresponding to each period.

Although it has been explained in the foregoing that the average $\overline{\Delta P}_i$ is computed on the basis of the preceding k data, that is, $$\overline{\Delta P}_i = (1/k) \sum_{i-k}^{i} \Delta P_{i-1},$$

it is not possible to obtain the average $\overline{\Delta P}_i$ when $i-1 < k$. Therefore, it is necessary to define the value $\overline{\Delta P}_i$ in a different manner when $i-1 < k$. For example, the value $\overline{\Delta P}_i$ may be decided to be constant such as $\overline{\Delta P}_i = C$ when $i-1 < k$, where the constant C may be determined by the operator based on the past data. Alternatively, the value $\overline{\Delta P}_i$ may be defined such as $$\overline{\Delta P}_i = (1/i) \sum_{1}^{i} (\Delta P_{i-1} + C)$$

when $i-1 < k$, where $\Delta P_0 = 0$ and C is a constant determined by the operator based on the past data. It is also possible to arrange that the measurement of $\Delta P_i$ is conducted on successive k objects to obtain the first k data $\Delta P_1$ to $\Delta P_k$ for determining the average $\overline{\Delta P}_i$ thereof without deciding the acceptability on these k objects and, thereafter, the inspection process shown in FIG. 7 is carried out for all the objects including the k objects used to determine the first average $\overline{\Delta P}_1$ in advance.

Figure 8:
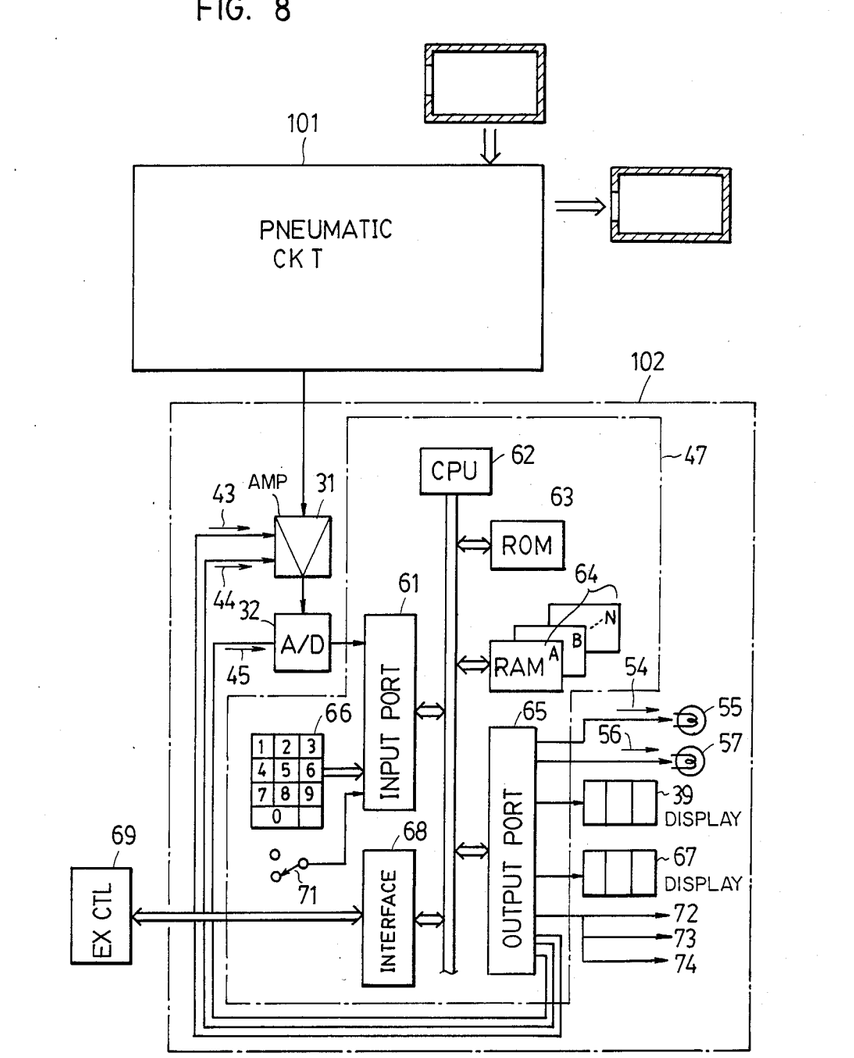
FIG. 8 is a block diagram of a leakage inspection apparatus according to another embodiment of the present invention.

FIG. 8 is illustrative of a leakage inspection apparatus according to another embodiment of the present invention.

The leakage inspection apparatus of FIG. 8 has a control unit 47 including an interface means 68 for receiving control signals from an external controller 69 connected therewith. The control unit 47 has a face panel supporting thereon an external/internal changeover switch 71. By shifting the changeover switch 71 to the external contact, an operation mode can be set by control signals issued from the external controller 69.

Figure 9A:
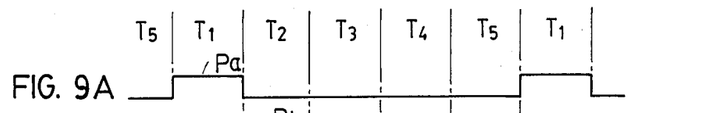
FIGS. 9A through 9E are diagrams of waveforms explanatory of operation of the leakage inspection apparatus illustrated in FIG. 8.
Figures 9B, 9C:
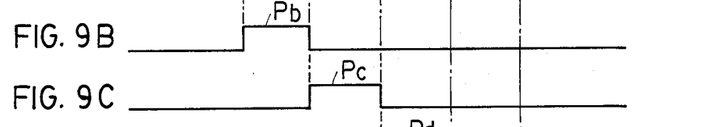
Figures 9D, 9E:
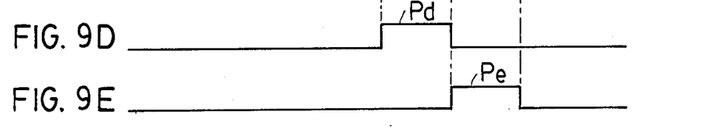

Control signals issued from the controller 69 include time signals for determining the periods $T_1$, $T_2$, $T_3$, $T_4$, $T_5$, a region specifying signal for the RAM 64 to write and read a corrected value when the type of the object 20 is changed, an internal/external changeover signal, and other signals. The embodiment of FIG. 8 is characterized particularly by the fact that the time signals for determining the periods $T_1$, $T_2$, $T_3$, $T_4$, $T_5$ can be supplied from the external controller 69. As shown in FIG. 9, the time signals are effective to supply the interface means 68 with five rectangular signals Pa through Pe having pulse durations corresponding to the periods $T_1$ through $T_5$, respectively. Rising and falling edges of the rectangular signals Pa through Pe are detected by the interface means 68, and detecting signals are read into the CPU 62 to issue valve control signals 72, 73, 74, a zero resetting signal 43, a gain switching signal 44, and an A/D conversion command signal 45. The time intervals of the respective periods $T_1$ through $T_5$ can freely be selected by varying the pulse durations of the rectangular signals Pa through Pe in the external controller 69.

Figure 10:
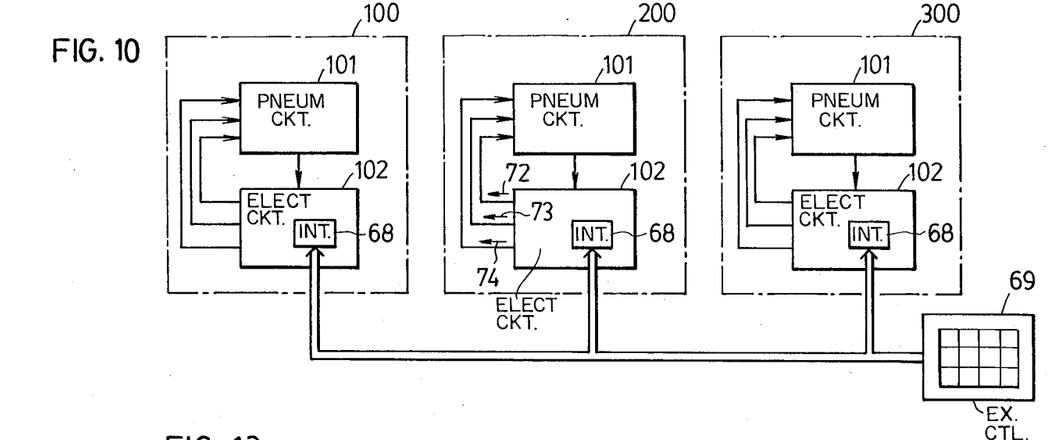
FIG. 10 is a block diagram showing an application of the leakage inspection apparatus of FIG. 8.

Since the leakage inspection apparatus is supplied with the time signals from the external source, a plurality of leakage inspection apparatus 100, 200, 300 as shown in FIG. 10 can operate in synchronism with each other.

With the embodiment of FIG. 8, the plurality of leakage inspection apparatus 100, 200, 300 (FIG. 10) can be brought into synchronism in operation by the external controller 69. This arrangement is advantageous for an application in which a plurality of products should be inspected in a production process or a single product has a plurality of areas to be inspected for leakage.

Furthermore, since the periods $T_1$ to $T_5$ can freely be selected by the single external controller 69, measuring conditions of the plural leakage inspection apparatus 100, 200, 300 can be set at one time.

By arranging the leakage inspection apparatus such that they can be supplied with a signal for specifying the regions A, B, ..., N in the RAM 64, different types of products can be inspected while effecting automatic zero point correction in each of the apparatus 100, 200, 300. As a result, products of different types can be inspected with increased accuracy.

While in the embodiment of FIG. 8 the time signals supplied from the external controller 69 to the control signal interface means 68 are rectangular signals Pa to Pe, the time signals may be digital signals. In such an alternative, the interface means 68 may be provided with a register for storing time values for the periods $T_1$, $T_2$, $T_3$, $T_4$, $T_5$.

Figure 11:
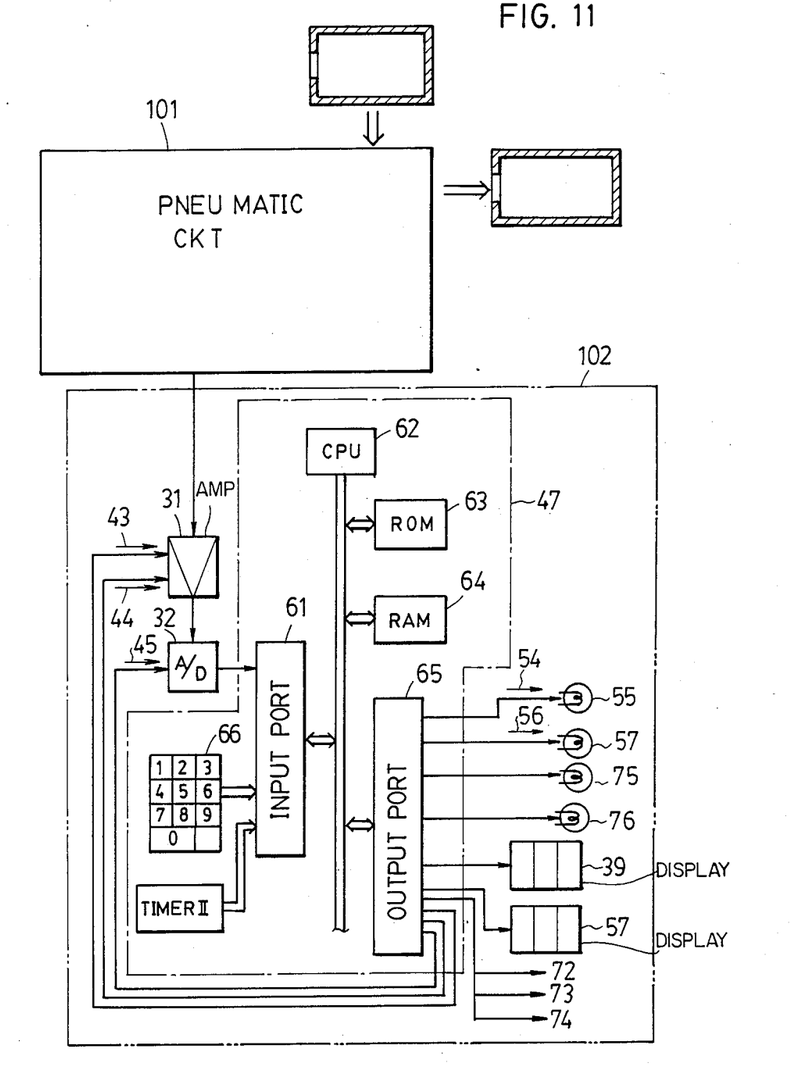
FIG. 11 is a block diagram of a leakage inspection apparatus according to still another embodiment of the present invention.
Figure 12:
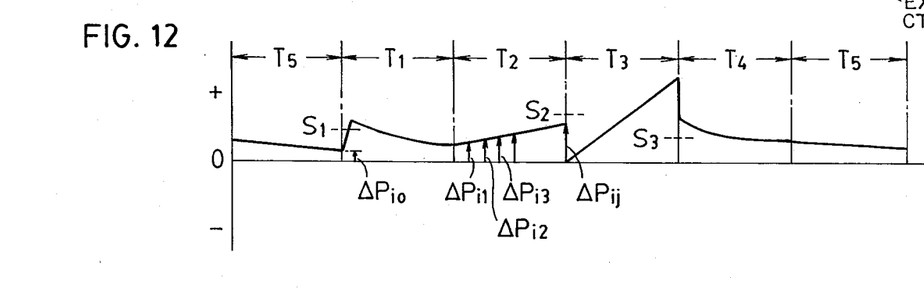
FIG. 12 is a diagram of a waveform explanatory of operation of the leakage inspection apparatus illustrated in FIG. 11.

FIG. 11 shows a leakage inspection apparatus constructed according to still another embodiment of the invention. The leakage inspection apparatus of FIG. 11 has a function of determinning whether there is a large leakage in the balancing period $T_2$.

Where the object being inspected suffers from a large leakage, the differential pressure detector 23 generates a large differential pressure output in the balancing period $T_2$ after pressurization. When the differential pressure output exceeds the preset value, a large leakage can be determined as being present. Upon detection of the large leakage, the inspecting period $T_3$ is not executed, but the defectiveness of the object is immediately indicated and the inspection process is finished. Thus, the time required for inspection can be shorter.

The function of determining whether there is a large leakage in the balancing period leads to the following shortcoming: When the differential pressure detector 23 and the amplifier means 31 suffer from a zero point drift, the amplifier means 31 issues a pressure measurement signal which is equivalent to an apparent pressure difference even if there is no leakage. Such a zero point drift may be large enough to exceed the preset value for determining whether there is a large leakage. If the inspection process continues with the zero point drift in excess of the preset value, then acceptable objects will be determined as being defective.

To cope with the above drawback, in the embodiment shown in FIG. 11, a zero point drift in each of the differential pressure detector 23 and the amplifier means 31 is measured in the rest period $T_5$, and the control unit determines if the zero point drift is smaller than the preset value. Furthermore, the zero point drift is substracted from the detected differential pressure generated in the balancing period $T_2$ to produce a corrected value, which will be compared with the limit value.

In the apparatus shown in FIG. 11, a first setting value $P_c$, a second setting value $P_d$, and a third setting value $\delta_0$ are entered through the keyboard 66 and stored in the RAM 64.

The pneumatic circuit 101 in FIG. 11 is of the same construction as that shown in FIGS. 1 and 6. The apparatus of FIG. 11 is characterized in that the RAM 64 has addresses for storing the first, second, and third setting values $P_c$, $P_d$, $\delta_0$, there is an indicator 75 for indicating that the zero point of each of the differential pressure detector 23 and the amplifier means 31 is varied in excess of the preset value, and an indicator 76 for indicating whether there is a large leakage or not, and that the microcomputer 47 implements a means for comparing a digital value $\Delta P_{i0}$ converted by the A/D converter at the time the rest period is over with the first setting value $P_c$, a means for substracting the digital value $\Delta P_{i0}$ from digital values $\Delta P_{i1}, \Delta P_{i2}, \ldots \Delta P_{ij}$ converted by the A/D converter in the balancing period $T_2$, a means for determining whether the substracted values are in excess of the second setting value $P_d$, a means for correcting measured data $\Delta P_i$ obtained when the inspecting period $T_3$ is finished with a corrective value $\overline{\Delta P}_i$ determined from past data, and a discriminator means for determining whether the corrected data $\delta_i = \Delta P_i - \overline{\Delta P}_i$ exceeds the third setting value $\delta_0$ to judge the acceptability of the object inspected.

The leakage inspection apparratus shown in FIG. 11 will operate as follows: When one inspection cycle is finished to start ith inspection cycle, a final measured pressure value $\Delta P_{i0}$ at the time the rest period $T_5$ is over is read (FIG. 2) and compared with the first setting value $P_c$ stored in the RAM 64. The final measured pressure value $\Delta P_{i0}$ corresponds to the zero point drift of the differential pressure detector 23 and the amplifier means 31. If the final measured pressure value $\Delta P_{i0}$ falls within an allowable zero point drift range, that is, the first setting value $P_c$, then the object is determined as being acceptable with respect to the zero point drift, and is continuously inspected.

If the final measured pressure value $\Delta P_{i0}$ exceeds the first setting value $P_c$, the zero point drift of the analog system composed of the differential pressure detector 23 and the amplifier means 31 is determined as exceeding the allowable value $P_c$, whereupon the indicator 75 is turned on to indicate that the zero point is shifted. At the same time, operation of the leakage inspection apparatus can be stopped.

Furthermore, in the balancing period $T_2$, A/D conversion is carried out at high speed to produce measured pressure values $\Delta P_{i1}, \Delta P_{i2}, \Delta P_{i3}, \ldots, \Delta P_{ij}$ with time, and the final measured pressure value $\Delta P_{i0}$ is subtracted from each of the measured pressure values $\Delta P_{ij}$. The difference $D_{ij} = \Delta P_{ij} - \Delta P_{i0}$ are compared with the second setting value $P_d$. If as a result of comparison each difference $D_{ij}$ is smaller than the second setting value $P_d$, then the object being inspected is determined as having no large leakage. If on the other hand the difference $D_{ij}$ is greater than the second setting value $P_d$, then the object is determined as suffering from a large leakage, and the indicator 76 is turned on to indicate that there is a large leakage and the object is defective.

When there is no large leakage, the same operations as have been explained with respect to FIGS. 6 and 7 are executed, that is, the control unit 47 resets the amplifier means 31 to zero, and enters the inspecting period $T_3$. In the inspecting period $T_3$, the gain of the amplifier means 31 is switched to a higher value to increase the amplifier sensitivity for amplifying and reading a variation in the differential pressure. A final measured pressure value $\Delta P_i$ in the inspecting period $T_3$ is corrected by a corrective value $\overline{\Delta P}_i$, and the corrected value $\delta_i = \Delta P_i - \overline{\Delta P}_i$ is compared with the third setting value $\delta_0$. If the corrected value $\delta_i$ is smaller than the third setting value $\delta_0$, then the object being inspected is judged as being acceptable and the indicator 55 is energized. If the corrected value $\delta_i$ is in excess of the third setting value $\delta_0$, then the object is determined as being defective and the indicator 57 is turned on.

The corrective value $\overline{\Delta P}_i$ is generated by reading final measured pressure values $\Delta P_i$ in a plurality of past inspecting cycles and computing an average of the final measured pressure values $\Delta P_i$, as with the previous embodiments.

Figure 13:
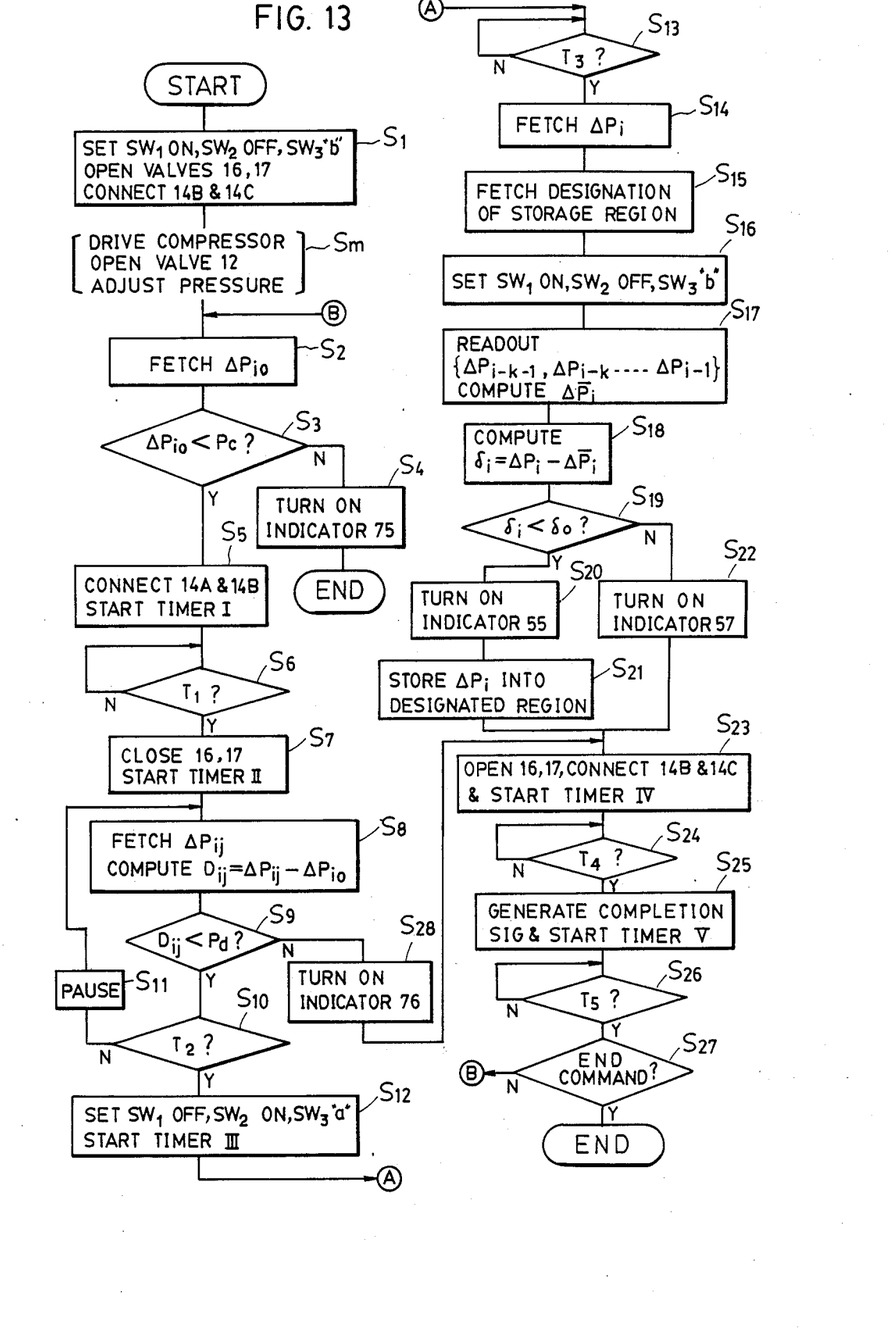
FIG. 13 is a flowchart of operation of the leakage inspection apparatus illustrated in FIG. 11.

A program for operating the apparatus of FIG. 11 is illustrated in the flowchart of FIG. 13. Steps $S_1$, $S_m$, $S_5$–$S_7$ and $S_{12}$–$S_{27}$ in FIG. 13 are substantially identical with steps $S_1$, $S_m$, $S_2$–$S_4$ and $S_6$–$S_{21}$, respectively, of FIG. 7, and therefore explanation of these steps is not repeated here. The features of operations shown in FIG. 13 are as follows: After manually adjusting pressure in step $S_m$, the output representing the final measured value $\Delta P_{i0}$ is fetched from the A-D converter 32 in step $S_2$, and it is checked whether the fetched value $\Delta P_{i0}$ is smaller than the set value $P_c$ in step $S_3$. If the value $\Delta P_{i0}$ is decided to be not smaller than the set value $P_c$, the indicator 75 is turned ON in step $S_4$ to indicate that the output from an amplifier means 31 includes extraordinarily large zero drift and the inspection process is stopped. If the value $\Delta P_{i0}$ is smaller than the set value $P_c$ in step $S_3$, the operation proceeds to step $S_5$, $S_6$ to start the pressurizing period $T_1$. After completing the period $T_1$ by closing the valves 16, 17, a timer II is started in step $S_7$ to start the balancing period $T_2$. According to the embodiment shown in FIGS. 11 and 13, the following operations are carried out during this balancing period $T_2$: In step $S_8$, the output $\Delta P_{ij}$ from the A-D converter 32 is fetched and a difference $D_{ij}$ between the fetched value $\Delta P_{ij}$ and the final value $\Delta P_{i0}$ is computed. In step $S_9$, the difference $D_{ij}$ is compared with the set value $P_d$ and if the value $D_{ij}$ is smaller than the set value $P_d$, the operation proceeds to step $S_{28}$, where the indicator 76 is turned ON to indicate that the object under inspection is not acceptable, and then goes to step $S_{23}$, thereby skipping the inspecting period $T_3$.

In the embodiment of FIG. 11, the RAM 64 may not necessarily be provided with a plurality of storage regions. Since the instruction "START TIMER II" in step $S_7$ and the time deciding operation in step $S_{10}$ are separated by steps $S_8$ and $S_9$, it is necessary to implement the timer II by a hardware arrangement as shown in FIG. 11. However, instead of employing a hardware constructed timer II, it is also possible to achieve an equivalent operation through program only. That is, the program of FIG. 13 can be modified to execute the operation steps $S_8$ and $S_9$ a predetermined number of times by carrying out an operation $K \leftarrow K+1$ immediately before step $S_8$, where K is a variable initially preset to zero, and replacing the decision operation in step $S_{10}$ by a decision operation $K = M$?, where M is a predetermined positive integer. In this case, the instruction "START TIMER II" in step $S_7$ is deleted and the program returns to the operation $K \leftarrow K+1$ via step $S_{11}$ if $K = M$ is not satisfied in step $S_{10}$.

The function of the embodiment of FIG. 11 may be added to the leakage inspection apparatus shown in FIGS. 6 and 8. Moreover, the leakage inspection apparatus of FIGS. 6, 8, and 11 may be combined into another leakage inspection apparatus.

Figure 14:
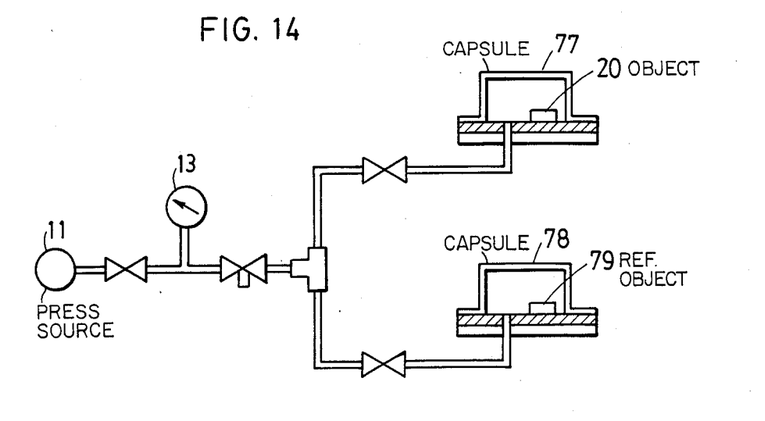
FIG. 14 is a block diagram of a leakage inspection apparatus of another type of which the present invention is applicable.

In the above embodiments, leakage inspection is performed by introducing an air pressure into the object 20 and the reference tank 22. For inspecting small-size and hermetically sealed articles such as water-resistant wristwatches, the object 20 may be housed in an inspection capsule 77 (FIG. 14) and a leakage-free reference object 79 may be housed in a reference capsule 78, and an air pressure may be introduced into the inspection and reference capsules 77, 78 to apply the air pressure exteriorly to the object 20 and the reference object 79. Then, a difference, if any, between the pressures in capsules 77, 78 is detected to determine whether the object 20 suffers from a leakage. Such a capsule-type leakage inspection pneumatic circuit may be combined with the electric circuit 102 in the leakage inspection apparatus shown in FIGS. 6, 8, and 11.

While in all of the above embodiments the pressure difference between the object 20 being inspected and the reference tank 22 is measured for leakage inspection, the present invention is also applicable to a leakage inspection apparatus of the type in which an air pressure is applied simply to an object to be inspected and any change in the applied air pressure with time is detected for leakage detection.

Although certain preferred embodiments have been shown and described, it should be understood that many changes and modifications may be made therein without departing from the scope of the appended claims.

What is claimed is:

1. In a leakage inspection method of the type wherein successive inspection cycles are performed each of which cycles includes a pressurizing procedure for applying an air pressure to an object to be inspected, followed by a balancing procedure for stabilizing the air pressure in said object, followed by an inspecting procedure wherein pressure measuring means are used to detect any change in pressure in the object a fixed period of time after completion of said balancing procedure, the improvement wherein said inspecting procedure comprises the steps of:

zero-resetting an amplifier at the start of said inspecting procedure, said amplifier receiving a pressure signal from said pressure measuring means A-D converting the output from the amplifier by use of an A-D converter to produce currently measured pressure change data $\Delta P_i$ in a digital form;

reading out a number of previously measured pressure change data up to a predetermined fixed number of such data from a selected one of a plurality of storage regions which are provided in a storage means, said storage regions corresponding respectively to different types of the object which are to be inspected, and said selected region corresponding to the type of object that is currently being inspected;

averaging the measured data read out from said selected storage region to produce an average value $\Delta \bar{P}_i$;

computing a difference $\delta_i$ between the currently measured data $\Delta P_i$ and the average value $\Delta \bar{P}_i$;

comparing the difference $\delta_i$ to a limit value $\delta_o$; and when $\delta_i$ is less than $\delta_o$, producing an accept signal and storing said currently measured data in the said selected storage region of said storage means.

2. A leakage inspection method according to claim 1 comprising the step, conducted before the pressurizing procedure, of fetching a measured pressure change data $\Delta P_{io}$ from the A-D converter, the subsequent balancing procedure comprising a step of fetching a measured pressure change data $\Delta P_{ij}$ from the output of said A-D converter, computing a difference $D_{ij}$ between the measured pressure change data $\Delta P_{io}$ and $\Delta P_{ij}$ before commencing the inspecting procedure, determining whether the difference $D_{ij}$ is smaller than a predetermined value $P_d$, and if the difference $D_{ij}$ is not smaller than $P_d$, producing a signal indicating the existence of an unacceptably large leakage and terminating the inspection cycle before commencing the inspecting procedure.

3. A leakage inspection method according to claim 1 comprising, before the inspecting procedure, the steps of fetching a measured pressure change data $\Delta P_{io}$ from the A-D converter, determining whether the measured pressure change data $\Delta P_{io}$ is smaller than a predetermined constant value $P_c$, and if it is not, terminating the inspection cycle.

* * * * *